United States Patent [19]

Sarnosky et al.

[11] Patent Number: 4,610,705
[45] Date of Patent: Sep. 9, 1986

[54] FILTER FOR DUCTLESS RANGE HOOD

[75] Inventors: Joseph R. Sarnosky, Fort Atkinson; David W. Wolbrink, Hartford, both of Wis.

[73] Assignee: Broan Manufacturing Co. Inc., Hartford, Wis.

[21] Appl. No.: 668,716

[22] Filed: Nov. 6, 1984

[51] Int. Cl.$^4$ .............................................. B01D 53/04
[52] U.S. Cl. ........................................ 55/316; 55/387; 55/485; 55/486; 55/493; 55/DIG. 31; 55/DIG. 36
[58] Field of Search ................. 55/316, 387, 481, 486, 55/492, 493, 501, DIG. 31, DIG. 36, 485, 487, 488, 489; 210/314, 315, 488, 489

[56] References Cited

U.S. PATENT DOCUMENTS

| | | | |
|---|---|---|---|
| 1,030,028 | 6/1912 | Stampahar et al. | 55/485 |
| 1,395,833 | 11/1921 | Kling et al. | 55/486 X |
| 1,895,642 | 1/1933 | Preble | 55/493 X |
| 1,941,450 | 1/1934 | Sylvan | 55/485 |
| 2,019,867 | 11/1935 | Nelson | 55/492 X |
| 2,108,283 | 2/1938 | Drew et al. | 55/485 |
| 2,220,127 | 11/1940 | Slayter | 55/485 |
| 2,325,657 | 8/1943 | Burkness | 55/486 X |
| 3,075,335 | 1/1963 | Bandlow | 55/DIG. 36 |
| 3,249,037 | 5/1966 | Stalker | 55/DIG. 36 |
| 3,250,063 | 5/1966 | Andrews | 55/487 X |
| 3,276,597 | 10/1966 | Mesek et al. | 55/487 X |
| 3,391,689 | 7/1968 | Roger | 55/DIG. 36 |
| 3,438,180 | 4/1969 | Klouda | 55/485 X |
| 3,577,710 | 5/1971 | Feldman | 55/316 |
| 3,630,007 | 12/1971 | Neumann | 55/387 |
| 3,861,894 | 1/1975 | Marsh | 55/493 X |
| 4,115,082 | 9/1978 | Newell | 55/501 X |
| 4,141,703 | 2/1979 | Mulchi | 55/487 X |
| 4,252,547 | 2/1981 | Johnson | 55/316 X |
| 4,319,898 | 3/1982 | Maierhofer | 55/501 X |
| 4,382,440 | 5/1983 | Kapp et al. | 55/486 X |
| 4,385,911 | 5/1983 | Popeil et al. | 55/316 |

*Primary Examiner*—Robert Spitzer
*Attorney, Agent, or Firm*—Andrus, Sceales, Starke & Sawall

[57] ABSTRACT

A filter (2) for a ductless range hood includes a layer (8) providing an impact barrier for removing coarse particles such as grease spatters from cooking discharges and resisting the heat of incoming discharges, for preserving filtering capacity and service life of downstream layers, a second layer (10) providing absorption of grease remaining in the cooking discharge after passage through the first layer, a third layer (12) for removing noxious gases such as oxides of nitrogen and carbon monoxide from the cooking discharges and for absorbing odors, and a fourth layer (14) for removing fine particles such as smoke from the cooking discharges. Various combinations of layers are disclosed as well as various structural and framing configurations.

23 Claims, 7 Drawing Figures

FILTER FOR DUCTLESS RANGE HOOD

BACKGROUND AND SUMMARY

The invention relates to filters for ductless range hoods.

Range hoods are employed above kitchen stoves and ranges to draw off the smoke and cooking effluent contained in the discharges produced during cooking. A ducted range hood discharges the fumes through a duct to the outside of the house. A ductless range hood passes the cooking discharges through a filter and returns the filtered air back to the kitchen.

Ductless range hoods are easier and more economical to install than ducted hoods since they avoid the expense of the ductwork. However, to achieve effective and efficient operation, the design of ductless range hoods becomes more critical than ducted hoods. For example, on the one hand it is desired to move a large volume of air through the range hood to capture all the discharges from the range. On the other hand, smaller volume air flow through the filter may be preferred to obtain effective filtration by the filter. The size of particles in cooking discharges range from large grease particles to small smoke particles of less than one micron in diameter. These and other considerations have caused significant difficulty in designing a suitable filtering arrangement.

There exists a need for improved performance in ductless range hoods, particularly in the effectiveness of filtration. The present invention addresses this need and provides a filter of enhanced effectiveness and efficiency in filtering action and construction.

DETAILED DESCRIPTION

Figure 1:
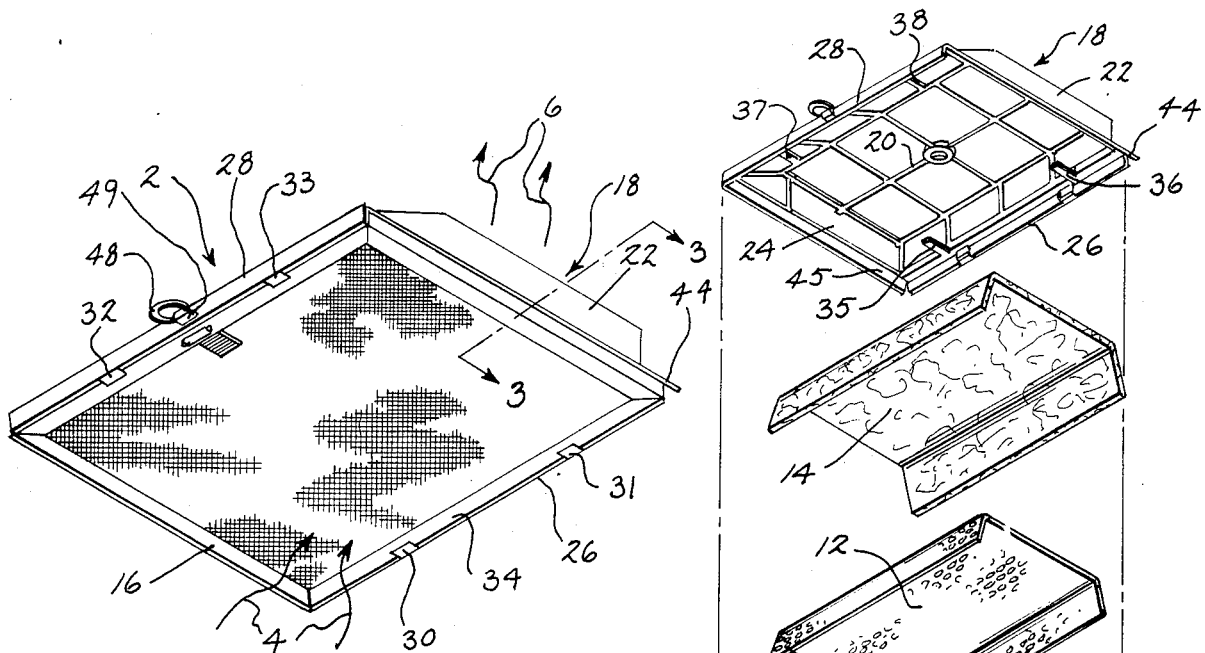
FIG. 1 is an isometric view of the intake underside of a filter in accordance with the invention.
Figure 2:
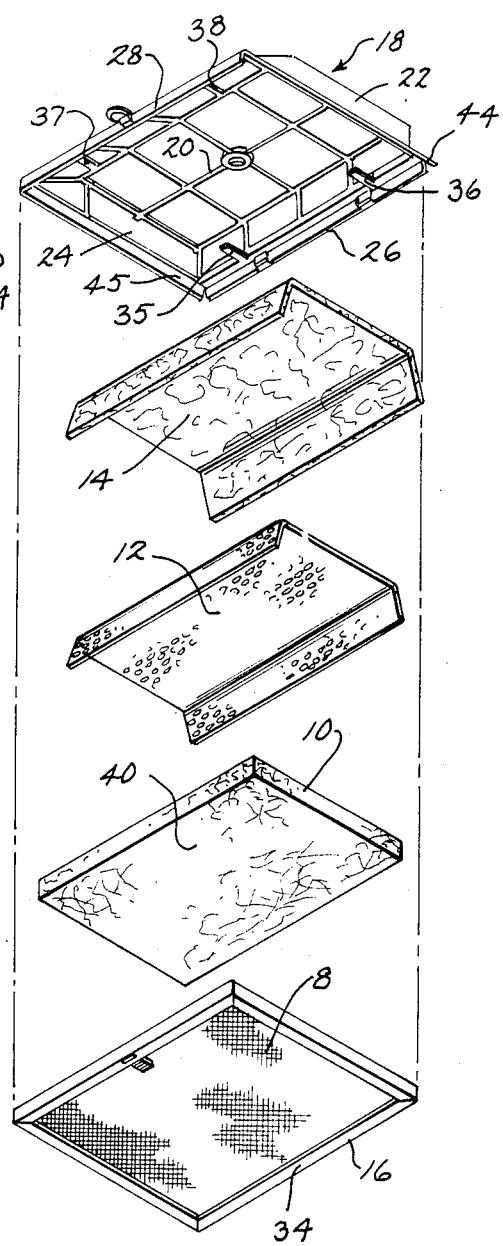
FIG. 2 is an exploded isometric view of the filter of FIG. 1.

FIG. 1 shows a filter 2 for a ductless range hood. In the orientation in FIG. 1, cooking discharges flow upwardly as shown at arrows 4 into the intake side of the filter, and exit from the discharge side on top of the filter as shown at arrows 6. The filter has a first layer 8, FIG. 2, providing an impact barrier for removing coarse particles such as grease spatters from cooking discharges and resisting the heat of incoming discharges, for preserving filtering capacity and service life of downstream filtering layers. Layer 8 is a wire mesh such as a metallic screen or multiple layers of slit and expanded metal foil. A second layer 10 provides absorption of grease remaining in the cooking discharge after passage through first layer 8. Second layer 10 is composed of resilient high loft large surface area material, such as fiber glass, woven fabric, felted fabrics, or non-woven fibers of polymeric material such as polypropylene, polyethylene or polyester. A third layer 12 is provided for removing noxious gases such as oxides of nitrogen and carbon monoxide from the cooking discharges and for absorbing odors. The material of third layer 12 is charcoal, silica gel, non-woven material impregnated with charcoal or cellulose base material impregnated with charcoal, or potassium permanganate impregnated crystals. A fourth layer 14 is provided for removing fine particles such as smoke from the cooking discharges, and is of a material such as fiber glass, felted polyethylene, spun polyethylene, woven polyethylene, felted polypropylene, spun polypropylene, woven polypropylene, or non-woven fabrics of polymeric materials such as polypropylene, polyethylene or polyester. Layer 14 is downstream of layer 12 which is downstream of layer 10 which is downstream of layer 8.

Layer 8 is bound in a peripheral sub-frame 16 around its perimeter. The remaining downstream layers 10, 12, and 14 are bound between first layer 8 and a main frame 18 having a rear grid 20 on its discharge face. Main frame 18 has outer sidewalls such as 22 and 24 extending forwardly upstream along the outer side edges of layers 14, 12, and 10 to confine these layers. Main frame 18 has front sidewall edges such as 26 and 28 to secure sub-frame 16 to hold the filter system in assembled condition.

Figure 3:
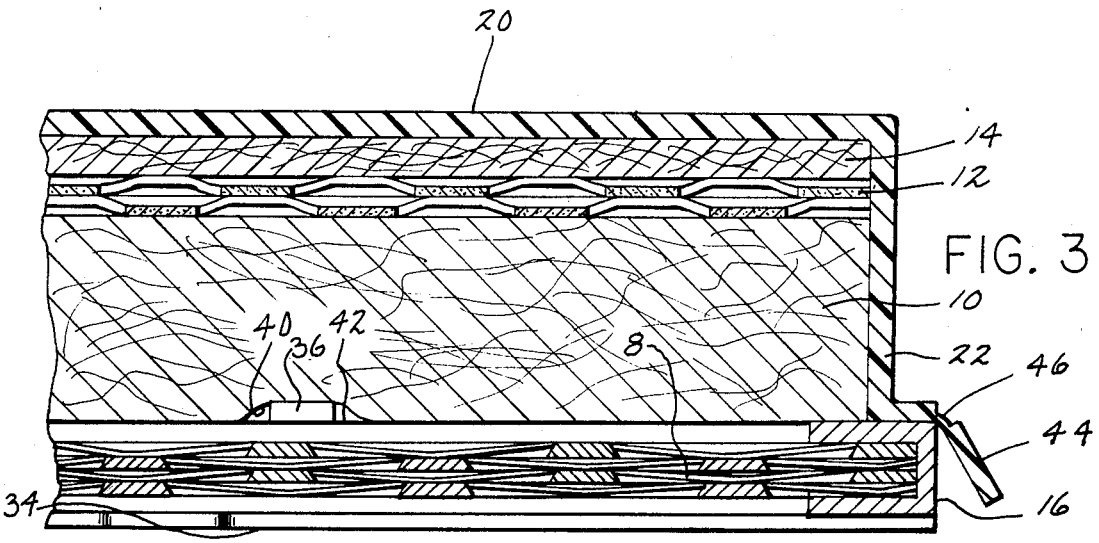
FIG. 3 is a cross-sectional view taken along line 3—3 of FIG. 1.

The front sidewall edges such as 26 and 28 of main frame 18 include clip means releasably engaging sub-frame 16, for example as provided by tabs 30 and 31 on front sidewall edge 26, and tabs 32 and 33 on front sidewall edge 28. The set of tabs 30–33 extend from the sidewall front edges of the main frame laterally inwardly and engage the front upstream side 34 of sub-frame 16. A second set of tabs 35–38 extend laterally inwardly from the sidewall front edges 26 and 28 of the main frame and engage the front upstream side 40 of layer 10 to retain layers 10, 12, and 14 in main frame 18. The second set of tabs 35–38 extend along the back downstream side 42, FIG. 3 of sub-frame 16.

In the embodiment shown, main frame 18 has four sides, 22, 24, and the sides having front edges 26 and 28. The first set of tabs 30–33 extend from two opposing sides towards each other. One or both of the remaining sides 22 and 24 have a flap such as 44, 45 along the length thereof which is liftable, FIG. 3, to permit sliding entry therethrough of sub-frame 16 behind the first set of tabs 30–33 and in front of the second set of tabs 35–38, in a direction transverse to cooking discharge flow. Main frame 18 is a plastic member, and flap 44 is tilted or pivoted at a reduced thickness section 46 in hinge-like manner due to the flexible semi-resilient bending of the plastic. This enables removal and replacement of sub-frame 16 and/or any of the layers. Flaps 44 and 45 provide a sealing function when installed in the hood and prevent air from bypassing the filter system.

Sub-frame 16 may also be removed by deforming the tabs outwardly. For example, tabs 30 and 31 are deformed outwardly beyond the outer edge of sub-frame 16 to relese the latter and permit removal and replacement thereof. Sidewall front edges 26 and 28 extend forwardly along the edge of sub-frame 16 and the entire sidewall front edge is bendable outwardly along its entire length. These sidewalls are semi-stiff plastic material which return to a position holding sub-frame 16 after deformation. A ring 48 on pull tab 49 on frame 18 assists removal.

Figure 4:
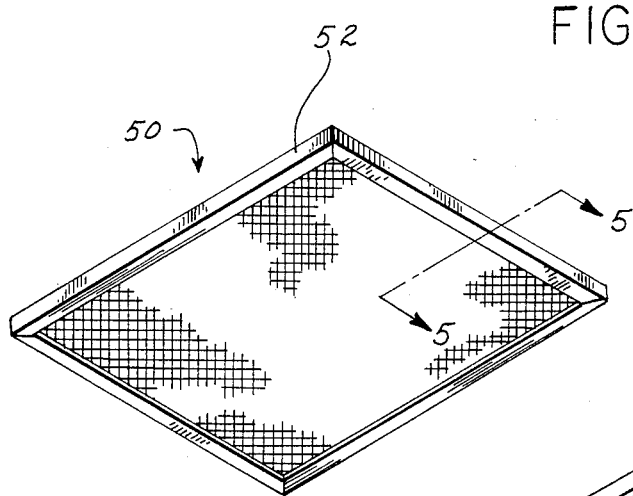
FIG. 4 is an isometric view of the intake side of an alternate embodiment of a filter in accordance with the invention.
Figure 5:
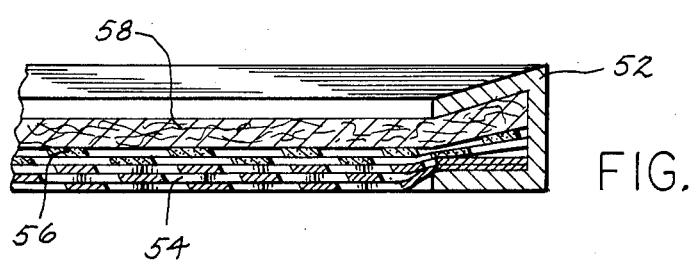
FIG. 5 is a cross-sectional view taken along line 5—5 of FIG. 4.

FIGS. 4 and 5 show a filter 50 in frame 52. The filter has a first layer 54 providing an impact barrier for removing coarse particles such as grease spatters from cooking discharges and resisting the heat of incoming discharges, for preserving filtering capacity and service life of downstream filtering layers. Layer 54 is a wire mesh such as a metallic screen or multiple layers of slit and expanded metal foil. A second layer 56 is provided for removing noxious gases such as oxides of nitrogen and carbon monoxide from the cooking discharges and for absorbing odors, and is charcoal, silica gel, non-woven material impregnated with charcoal or cellulose base material impregnated with charcoal, or potassium permanganate impregnated crystals. A third layer 58 absorbs grease in the cooking discharge and also removes fine particles such as smoke, and is of a material such as fiber glass, felted polyethylene, spun polyethylene, woven polyethylene, felted polypropylene, spun polypropylene, woven polypropylene, or non-woven fabrics of polymeric materials such as polypropylene, polyethylene or polyester. The discharge flows serially through layers 54, 56, and 58.

Figure 6:
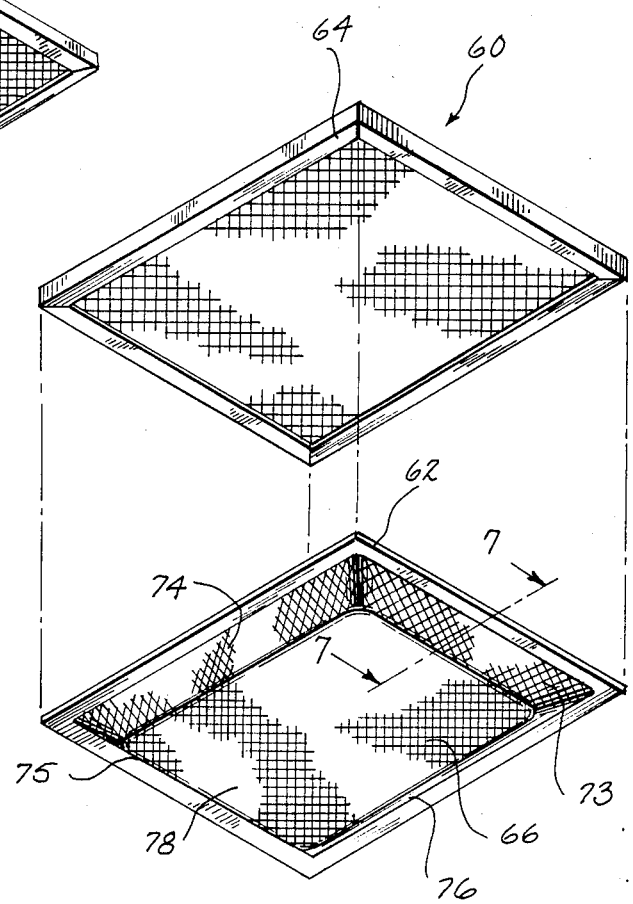
FIG. 6 is an exploded isometric view of another alternate embdiment of a filter in accordance with the invention.
Figure 7:
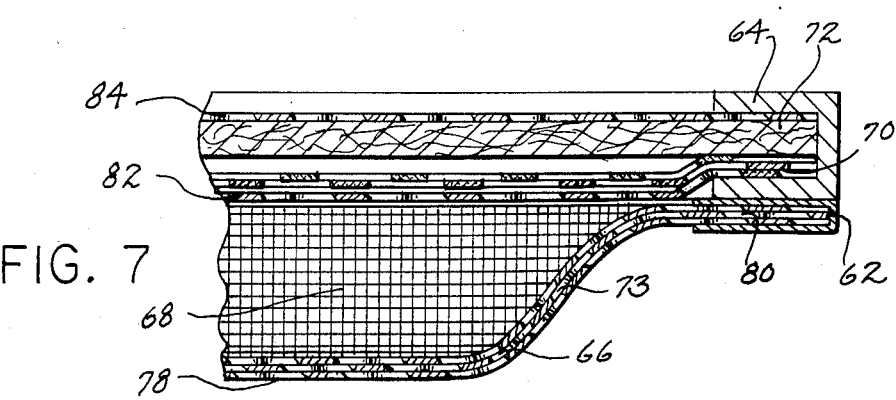
FIG. 7 is a cross-sectional view taken along the line 7—7 of FIG. 6.

FIGS. 6 and 7 shows a filter system 60 in a pair of frames 62 and 64. The filter has a first layer 66 of wire mesh configured forwardly away from the remaining downstream layers to define an agitation chamber 68 for the incoming cooking discharge flow. First layer 66 provides an impact barrier for removing coarse particles such as grease spatters from cooking discharges and resisting the heat of incoming discharges, for preserving filter capacity and service life of downstream filter layers. A second layer 70 is provided for removing the noxious gases such as oxides of nitrogen and carbon monoxide from the cooking discharges and for absorbing odors, and is of a material such as charcoal, silica gel, non-woven material impregnated with charcoal or cellulose base material impregnated with charcoal, or potassium permanganate impregnated crystals. A third layer 72 absorbs grease remaining in the cooking discharge and removes fine particles such as smoke, and is of material such as fiber glass, felted polyethylene, spun polyethylene, woven polyethylene, felted polypropylene, spun polypropylene woven polypropylene, or non-woven fabrics of polymeric materials such as polypropylene, polyethylene or polyester.

First layer 66 is a wire mesh body having peripheral wire mesh sidewalls 73-76 extending between a substantially flat central wire mesh body portion 78 and an outer wire mesh flange 80 along the perimeter of the body. Outer wire mesh flange 80 is bound in frame 62 along the perimeter. Downstream layers 70 and 72 are bound in peripheral frame 64 having a perimeter coextensive with first frame 62 and mateable thereto for assembly of the filter. Wire mesh sidewals 73-76 of first layer 66 extend inwardly from the perimeter and extend forwardly away from downstream layers 70 and 72 in a direction opposite cooking discharge flow therethrough. Flat central wire mesh body portion 78 is spaced forwardly of the downstream layers and extends transversely to the direction of cooking discharge flow therethrough and between the inner upstream ends of wire mesh sidewalls 73-76. Frame 64 includes a pair of thin wire screens 82 and 84, or expanded metal, on the opposite facing sides thereof.

It is recognized that various modifications are possible within the scope of the appended claims.

We claim:
1. A filter for a ductless range hood comprising:
a first layer providing an impact barrier for removing coarse particles such as grease spatters from cooking discharges, and resisting the heat of incoming discharges for preserving filtering capacity and service life of downstream filtering layers;
a second layer providing absorption of grease remaining in the cooking discharge after passage through said first layer, said second layer comprising resilient high-loft large surface area material;
a third layer for removing noxious gases such as oxides of nitrogen and carbon monoxide from the cooking discharges and for absorbing odors; and
a fourth layer for removing fine particles such as smoke from the cooking discharges,
said four layers providing progressive filtration at a singular location removing large particles first and then progressively smaller particles;
wherein:
said first layer is a mesh comprising multiple layers of slit and expanded material;
said second layer is selected from the group consisting of fiber glass, woven fabric, felted fabrics, or non-woven fibers or polymeric material such as polypropylene, polyethylene or polyester;
said third layer is selected from the group consisting of charcoal, silica gel, non-woven material impregnated with charcoal or cellulose base material impregnated with charcoal, or potassium permanganate impregnated crystals; and
said fourth layer is selected from the group consisting of fiber glass, felted polyethylene, spun polyethylene, woven polyethylene, felted polypropylene, spun polypropylene, woven polypropylene, or non-woven fabrics of polymeric materials such as polypropylene, polyethylene or polyester.

2. A filter for a ductless range hood comprising:
a first layer providing an impact barrier for removing coarse particles such as grease spatters from cooking discharges, and resisting the heat of incoming discharges for preserving filtering capacity and service life of downstream filtering layers;
a second layer providing absorption of grease remaining in the cooking discharge after passage through said first layer, said second layer comprising resilient high-loft large surface area material;
a third layer for removing noxious gases such as oxides of nitrogen and carbon monoxide from the cooking discharges and for absorbing odors; and
a fourth layer for removing fine particles such as smoke from the cooking discharges;
wherein said first layer comprises a wire mesh body bound in a peripheral sub-frame around it perimeter, and said remaining downstream layers are bound between said first layer and a main frame having a rear grid on its discharge face and having outer sidewalls extending forwardly upstream along the outer side edges of said remaining downstream layers to confine the latter and having sidewall front edges secured to said sub-frame to hold said filter in assembled condition.

3. The invention according to claim 2 wherein said sidewall front edges of said main frame include clip means releasably engaging said sub-frame.

4. The invention according to claim 3 wherein said sidewall front edges of said main frame have a first set of inwardly extending tabs engaging the front upstream side of said sub-frame, and said sidewall front edges of said main frame have a second set of inwardly extending tabs engaging the front upstream side of said second layer to retain said remaining downstream layers in said main frame, said second set of tabs extending along the back downstream side of said sub-frame.

5. The invention according to claim 4 wherein said main frame has four sides, said first set of tabs extend from two opposing sides towards each other, at least one of the remaining sides having a flap along the length thereof which is liftable to permit sliding entry of said subframe behind said first set of tabs and in front of said second set of tabs, in a direction transverse to cooking discharge flow, to permit removal and replacement thereof.

6. The invention according to claim 5 comprising flaps on said remaining sides, said flaps providing a sealing function when installed in said hood and preventing air from bypassing said filter.

7. The invention according to claim 4 wherein at least one tab of said first set is outwardly movable beyond the outer edge of said sub-frame to release the latter and permit removal and replacement thereof.

8. The invention according to claim 7 wherein at least one entire said sidewall front edge is bendable outwardly along its entire length, said last mentioned sidewall front edge extending forwardly along the edge of said sub-frame and having at least one tab of said first set extending laterally therefrom.

9. A filter for a ductless range hood comprising:
a first layer providing an impact barrier for removing coarse particles such as grease spatters from cooking discharges and resisting the heat of incoming discharges, for preserving filtering capacity and service life of downstream filtering layers;
a second layer for removing noxious gases such as oxides of nitrogen and carbon monoxide from the cooking discharges and for absorbing odors; and
a third layer providing absorption of grease in the cooking discharges and removing fine particles such as smoke therefrom,
wherein said second layer is downstream of said first layer, and said third layer is downstream of said second layer,
said three layers providing progressive filtration at a singular location removing large particles first and then progressively smaller particles;
wherein:
said first layer is a mesh comprising multiple layers of slit and expanded material;
said second layer is selected from the group consisting of charcoal, silica gel, non-woven material impregnated with charcoal or cellulose base material impregnated with charcoal, or potassium permanganate impregnated crystals; and
said third layer is selected from the group consisting of fiber glass, felted polyethylene, spun polyethylene, woven polyethylene, felted polypropylene, spun polypropylene, woven polypropylene, or non-woven fabrics of polymeric materials such as polypropylene, polyethylene or polyester.

10. A filter for a ductless range hood comprising:
a first layer configured forwardly away from downstream layers to define an agitation chamber, and providing an impact barrier for removing coarse particles such as grease spatters from cooking discharges and resisting the heat of incoming discharges, for preserving filtering capacity and service life of downstream filtering layers;
a second layer for removing noxious gases such as oxides of nitrogen and carbon monoxide from the cooking discharges and for absorbing odors; and
a third layer providing absorption of grease in the cooking discharges and removing fine particles such as smoke therefrom,
said three layers providing progressive filtration at a singular location removing large particles first and then progressively smaller particles;
wherein:
said first layer is a mesh comprising multiple layers of slit and expanded material;
said second layer is selected from the group consisting of charcoal, silica gel, non-woven material impregnated with charcoal or cellulose base material impregnated with charcoal, or potassium permanganate impregnated crystals; and
said third layer is selected from the group consisting of fiber glass, felted polyethylene, spun polyethylene, woven polyethylene, felted polypropylene, spun polypropylene, woven polypropylene, or non-woven fabrics of polymeric materials such as polypropylene, polyethylene or polyester.

11. A filter for a ductless range hood comprising:
a first layer configured forwardly away from downstream layers to define an agitation chamber, and providing an impact barrier for removing coarse particles such as grease spatters from cooking discharges and resisting the heat of incoming discharges, for preserving filtering capacity and service life of downstream filtering layers;
a second layer for removing noxious gases such as oxides of nitrogen and carbon monoxide from the cooking discharges and for absorbing odors; and
a third layer providing absorption of grease in the cooking discharges and removing fine particles such as smoke therefrom;
wherein said first layer comprises a wire mesh body having peripheral wire mesh sidewalls extending between a substantially flat central wire mesh body portion and an outer wire mesh flange along the perimeter of said body, said outer wire mesh flange being bound in a frame along said perimeter, the remaining said downstream layers being bound in a peripheral frame having a perimeter coextensive with said first mentioned frame and mateable thereto for assembly of said filter, said wire mesh sidewalls of said first layer extending inwardly from said perimeter and extending forwardly away from said downstream layers in a direction opposite cooking discharge flow therethrough, said substantially flat central wire mesh body portion extending transversely to the direction of cooking discharge flow therethrough and between the inner upstream ends of said wire mesh sidewalls.

12. A filter for a ductless range hood comprising:
a first layer bound in a peripheral sub-frame around its perimeter; and
one or more downstream layers bound between said first layer and a main frame having a rear grid on its discharge face and having outer side walls extending forwardly upstream along the outer side edges of said one or more downstream layers to confine the latter and having sidewall front edges secured to said sub-frame to hold said filter in assembled condition, wherein said sidewall front edges of said main frame include clip means releasably engaging said sub-frame.

13. A filter for a ductless range hood comprising:
a first layer bound in a peripheral sub-frame around its perimeter; and
one or more downstream layers bound between said first layer and a main frame having a rear grid on its discharge face and having outer side walls extending forwardly upstream along the outer side edges of said one or more downstream layers to confine the latter and having sidewall front edges secured to said sub-frame to hold said filter in assembled condition;
wherein said sidewall front edges of said main frame include clip means releasably engaging said sub-frame;
wherein said sidewall front edges of said main frame have a first set of inwardly extending tabs engaging the front upstream side of said sub-frame, and said sidewall front edges of said main frame having a second set of inwardly extending tabs engaging the front upstream side of the first of said one or more downstream layers in said main frame, said second set of tabs extending along the back downstream side of said sub-frame.

14. The invention according to claim 13 wherein said main frame has four sides, said first set of tabs extend from two opposing sides towards each other, at least one of the remaining sides having a flap along the length thereof which is liftable to permit sliding entry of said sub-frame behind said first set of tabs and in front of said second set of tabs, in a direction transverse to cooking discharge flow, to permit removal and replacement of said subframe and first layer.

15. The invention according to claim 14 comprising flaps on said remaining sides, said flaps providing a sealing function when installed in said hood and preventing air from bypassing said filter.

16. The invention according to claim 13 wherein at least one tab of said first set is outwardly movable beyond the outer edge of said sub-frame to release the latter and permit removal and replacement thereof.

17. The invention according to claim 16 wherein at least one entire said sidewall front edge is bendable outwardly along its entire length, said last mentioned sidewall front edge extending forwardly along the edge of said sub-frame and having at least one tab of said first set extending laterally therefrom.

18. A filter for a ductless range hood comprising a first wire mesh layer configured forwardly away from one or more downstream layers to define a chamber therebetween, said first wire mesh layer having peripheral wire mesh side walls extending between a substantially flat central wire mesh body portion and an outer wire mesh flange along the perimeter of said first layer, said outer wire mesh flange being bound in a frame along said perimeter, said one or more downstream layers being bound in a peripheral frame having a perimeter coextensive with said first mentioned frame and mateable thereto for assembly of said filter, said wire mesh sidewalls of said first layer extending inwardly from said perimeter and extending forwardly away from said one or more downstream layers in a direction opposite cooking discharge flow therethrough, said substantially flat central wire mesh body portion extending transversely to the direction of cooking discharge flow therethrough and between the inner upstream ends of said wire mesh sidewalls.

19. A filter for a ductless range hood comprising:
a first layer providing an impact barrier for removing coarse particles such as grease spatters from cooking discharges and resisting the heat of incoming discharges, for preserving filtering capacity and service life of downstream filtering layers;
a second layer for removing noxious gases such as oxides for nitrogen and carbon monoxide from the cooking discharges and for absorbing odors; and
a third layer providing absorption of grease in the cooking discharges and removing fine particles such as smoke therefrom,
said three layers providing progressive filtration at a singular location removing large particles first and then progressively smaller particles;
wherein said first layer comprises a flat wire mesh body prtion bound in a frame along its perimeter, the remaiing downstream said layers being bound in a peripheral frame having a perimeter coextensive with said first mentioned frame and mateable thereto for assembly of said filter.

20. The invention according to claim 19 wherein said first layer is a wire mesh comprising multiple layers of slit and expanded metal foil;
said second layer is selected from the group consisting of charcoal, silica gel, non-woven material impregnated with charcoal or cellulose base material impregnated with charcoal, or potassium permanganate impregnated crystals; and
said third layer is selected from the group consisting of fiber glass, felted polyethylene, spun polyethylene, woven polyethylene, felted polypropylene, spun polypropylene, woven polypropylene, or non-woven fabrics of polymric matrials such as polypropylene, polyethylene or polyester.

21. A filter for a ductless range hood comprising:
a first layer providing an impact barrier for removing coarse particles such as grease spatters from cooking discharges and resisting the heat of incoming discharges, for preserving filtering capacity and service life of downstream filtering layers;
a second layer providing absorption of grease remaining in the cooking discharge after passage through said first layer, said second layer comprising resilient high-loft large surface area material;
a third layer for removing noxious gases such as oxides of nitrogen and carbon monoxide from the cooking discharges and for absorbing odors;
a fourth layer for removing fine particles such as smoke from the cooking discharges;
said first layer comprising a flat wire mesh body portion bound in a frame along its perimeter, the remaining downstream said layers being bound in a peripheral frame having a perimeter coextensive with said first mentioned frame and mateable thereto for assembly of said filter.

22. The invention according to claim 21 wherein:
said first layer is a wire mesh;
said second layer is selected from the group consisting of fiber glass, woven fabric, felted fabrics, or non-woven fibers of polymeric material such as polypropylene, polyethylene or polyester;
said third layer is selected from the group consisting of charcoal, silica gel, non-woven material impregnated with charcoal or cellulose base material impregnated with charcoal, or potassium permanganate impregnated crystals; and said fourth layer is selected from the group consisting of fiber glass, felted polyethylene, spun polyethylene, woven polyethylene, felted polypropylene, spun polypropylene, woven polypropylene, or non-woven fabrics of polymeric materials such as polypropylene, polyethylene or polyester.

23. The invention according to claim 21 wherein at least one of said downstream layers includes peripheral portions extending from their perimeter rearwardly downstream in the same direction as cooking discharge flow.

* * * * *